US007600904B2

(12) United States Patent
Takada et al.

(10) Patent No.: US 7,600,904 B2

(45) Date of Patent: Oct. 13, 2009

(54) VEHICLE HEADLAMP

(75) Inventors: Kenichi Takada, Shizuoka (JP); Hirohiko Ohshio, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 11/755,258

(22) Filed: May 30, 2007

(65) Prior Publication Data

US 2007/0291502 A1 Dec. 20, 2007

(30) Foreign Application Priority Data

Jun. 16, 2006 (JP) ............................ 2006-167748

(51) Int. Cl.

| | |
|---|---|
| ***F21V 17/02*** | (2006.01) |
| ***F21V 7/00*** | (2006.01) |
| ***F21V 19/02*** | (2006.01) |
| ***B60Q 1/00*** | (2006.01) |
| ***F21S 8/00*** | (2006.01) |
| ***B60Q 1/14*** | (2006.01) |

(52) U.S. Cl. ....................... 362/512; 362/539; 362/514; 362/523; 362/284; 362/277

(58) Field of Classification Search ................. 362/512, 362/523, 524, 530, 532, 537, 536, 508, 514, 362/465, 277, 280, 284

See application file for complete search history.

(56) References Cited

U.S. PATENT DOCUMENTS 407,409 A * 7/1889 Lucas ......................... 248/590
4,887,191 A * 12/1989 Johansson ................... 362/485
4,954,933 A * 9/1990 Wassen ...................... 362/514
5,142,455 A * 8/1992 Kosmatka ................... 362/514
5,412,543 A 5/1995 Kobayashi et al.
5,911,502 A * 6/1999 Zillgitt et al. ............... 362/508
5,971,574 A * 10/1999 Taniuchi et al. ............. 362/508
6,007,221 A * 12/1999 Taniuchi et al. ............. 362/465
6,332,702 B1 * 12/2001 Hebler et al. ............... 362/523
6,354,722 B1 * 3/2002 Montenegro et al. ........ 362/514
6,457,851 B2 * 10/2002 Hamm ....................... 362/525
6,527,424 B2 * 3/2003 Rosenhahn et al. ......... 362/513
6,874,918 B2 * 4/2005 Tawa et al. .................. 362/465

FOREIGN PATENT DOCUMENTS

| | | |
|---|---|---|
| DE | 600 34 085 T2 | 12/2007 |
| EP | 0 889 280 A1 | 1/1999 |
| JP | 05-72005 | 9/1993 |
| JP | 06-052702 | 2/1994 |

* cited by examiner

*Primary Examiner*—Jong-Suk (James) Lee
*Assistant Examiner*—David J Makiya
(74) *Attorney, Agent, or Firm*—Fish & Ricahrdson P.C.

(57) ABSTRACT

A vehicle headlamp includes a light source bulb for emitting light, a base member fixed with a light source bulb, a reflector for reflecting light emitted from the light source bulb, a projecting lens for projecting light reflected by the reflector to a front side along an optical axis Ax, and a shade for blocking a portion of light directed from the reflector to the projecting lens. The vehicle headlamp displaces the reflector from a first position to a second position which is upward and rearward from the base member. The vehicle headlamp can facilitate obtaining a light distribution suitable for driving on a motorway or in wet conditions.

8 Claims, 8 Drawing Sheets

VEHICLE HEADLAMP

This application claims foreign priority from Japanese Patent Application No. 2006-167748, filed on Jun. 16, 2006, the entire contents of which are hereby incorporated by reference.

BACKGROUND OF THE INVENTION

1. Field of the Invention

The present disclosure relates to a vehicle headlamp capable of changing a light distribution pattern in accordance with the vehicle's operating condition.

2. Background

Generally, a vehicle headlamp of a projector type is arranged to form a light distribution pattern for a low beam having a cutoff line at an upper end edge by using a reflector to reflect light emitted from a light source of a halogen bulb or a discharge bulb and projecting reflected light to a front side by a projecting lens while blocking a portion of the reflected light by a shade.

Further, in recent years, a headlamp system, referred to as AFS (Adaptive Front Lighting System), has been proposed for producing a visual environment to facilitate safer driving by optimally controlling light in accordance with the vehicle's operating condition.

To move an entire lamp piece unit for a low beam of a vehicle headlamp in a left and right direction in cooperation with a steering angle or a vehicle speed, one AFS includes, for example, electronic control. As the vehicle travels around a curve, light is irradiated in a direction the vehicle turns, so that a wide field of view, including a steady gazing point viewed by a driver, is ensured to enable the driver quickly to recognize a hazard (e.g., a person, an object, an animal, a parked vehicle or the like) and to take evading action to maintain safety.

Further, recently there has been developed a light amount variable distribution type AFS for producing an optimum light distribution in accordance with various road conditions (e.g., suburb, motorway), weather conditions (e.g., rainy weather, fog), a vehicle speed or the like. In the future, it is expected to realize a further safe running environment by using such a light amount variable light distribution type AFS.

Japanese patent documents JP-U-05-072005 and JP-A-06-052702 propose vehicle headlamps for realizing a variable light distribution to change a light distribution pattern by moving a reflector fixedly provided with a light source bulb relative to a projecting lens.

However, according to the vehicle headlamp described in the foregoing references, although the position of a region having a large light amount in a light distribution pattern projected to the front side (i.e., a hot zone) can be changed, a change in the illuminance distribution cannot be obtained by partially increasing or reducing the illuminance. Therefore, the vehicle headlamp is not suitable for forming a light distribution pattern to obtain a light distribution of a motorway distribution capable of being used, for example, along a motorway or the like, or a wet light distribution capable of being used in rainy weather.

SUMMARY

In view of the foregoing, the current disclosure describes a vehicle headlamp suitable for obtaining light distributions that can be beneficial when traveling on a motorway or in wet conditions.

In one aspect, a vehicle headlamp includes:

a light source bulb for emitting light;

a base member fixed with the light source bulb;

a reflector for reflecting the light emitted from the light source bulb;

a projecting lens for projecting light reflected by the reflector to a front side along an optical axis; and a shade for blocking a portion of light directed from the reflector to the projecting lens;

wherein the vehicle headlamp has a reflector displacing mechanism for displacing to move the reflector from a first position to a second position disposed upward and rearward from the base member in parallel.

In some implementations, one or more of the following features are included. For example, the reflector displacing mechanism can include a pivoting arm attached pivotably to the base member and operable to urge the reflector, and an actuator for pivoting the pivoting arm.

The reflector displacing mechanism can include a guide member for holding the reflector to be able to slide to displace relative to the base member. In that case, the pivoting arm is operable to slide to displace the reflector from the first position to the second position along the guide member by pressing the reflector.

The reflector displacing mechanism can include a link mechanism for connecting the pivoting arm and the reflector and converting a pivoting displacement of the pivoting arm into a straight moving displacement of the reflector.

In some implementations, the reflector forms a basic light distribution when disposed at the first position and forms a motorway light distribution when disposed at the second position.

Some implementations include one or more of the following advantages. The reflector displacing mechanism for moving the reflector from the first position to the second position can be disposed upward and rearward from the base member in parallel and, therefore, the vehicle headlamp can be arranged as a lamp piece capable not only of changing a position and a light amount of a hot zone, but also capable of changing the total illuminance distribution. Therefore, the vehicle headlamp can be capable of realizing a variable light distribution in accordance with a number of various kinds of light distribution patterns.

Further, in contrast to moving the light source bulb, implementations of the present vehicle headlamp can be arranged to displace the reflector instead of moving the light source bulb. As there is no load on the light source bulb with regard to variable light distribution, a high reliability can be maintained without reducing the life of the light source bulb.

The reflector displacing mechanism can include the pivoting arm pivotably attached to the base member and arranged to be able to urge the reflector, and the actuator for pivoting the pivoting arm. Therefore, the light distribution can be changed by urging the reflector and moving the reflector by a simple arrangement.

The reflector displacing mechanism also can include the guide member for holding the reflector to be able to slide relative to the base member. The pivoting arm is arranged to slide and displace the reflector from the first position to the second position along the guide member by pressing the reflector. The vehicle headlamp is capable of realizing a variable light distribution in accordance with a number of various kinds of light distribution patterns by moving the reflector in parallel without being accompanied by a complicated drive structure.

Further, The reflector displacing mechanism can include the link mechanism for connecting the pivoting arm and the reflector and converting the pivoting displacement of the pivoting arm into the straight moving displacement of the reflector. The vehicle headlamp is capable of realizing a variable light distribution in accordance with a number of various light distribution patterns by moving the reflector in parallel without being accompanied by a complicated drive structure.

The vehicle headlamp can be arranged to form the basic light distribution when the reflector is disposed at the first position and to form the motorway light distribution when the reflector is disposed at the second position.

Other features and advantages will be readily apparent from the following detailed description, the accompanying drawings and the claims.

DETAILED DESCRIPTION OF THE EXEMPLARY EMBODIMENTS

Examples of embodiments of a vehicle headlamp according to the invention will be explained in reference to the drawings as follows.

A first embodiment of a vehicle headlamp according to the invention is explained in the following paragraphs.

Figure 1:
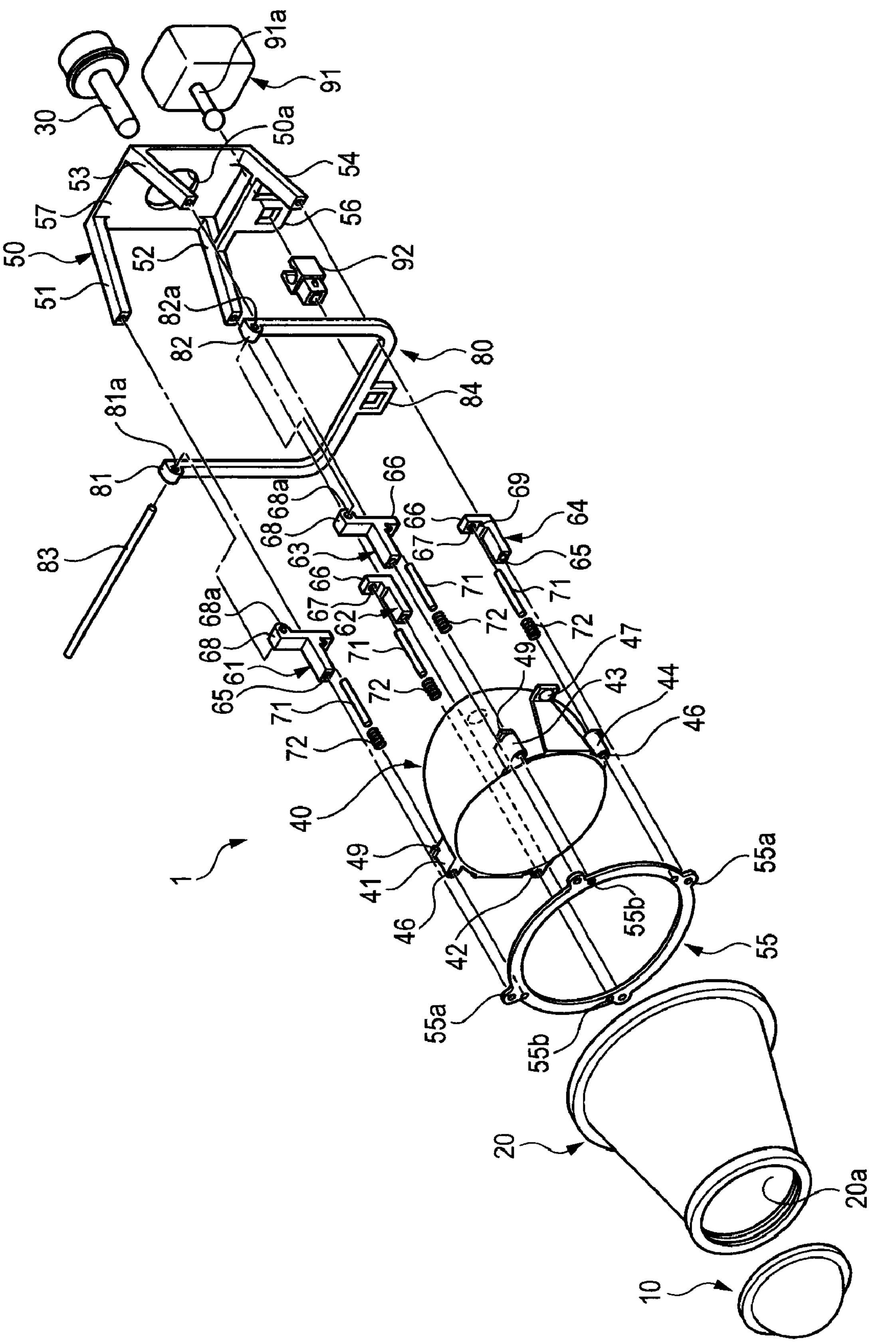
FIG. 1 is a disassembled perspective view of a vehicle headlamp according to a first embodiment.

As shown by FIG. 1, a vehicle headlamp 1 of a projector type includes a projecting lens 10, a lens holder 20 for fixedly supporting the projecting lens 10, a light source bulb 30 for emitting light, a reflector 40 for reflecting light emitted from the light source bulb 30, a base member 50 for fixedly supporting the light source bulb 30. Further, as shown by FIG. 1 and FIG. 4, an inner peripheral face 20*a* of the lens holder 20 has a shade 22 erected from a side of the inner peripheral face to an upper side.

Figure 4:
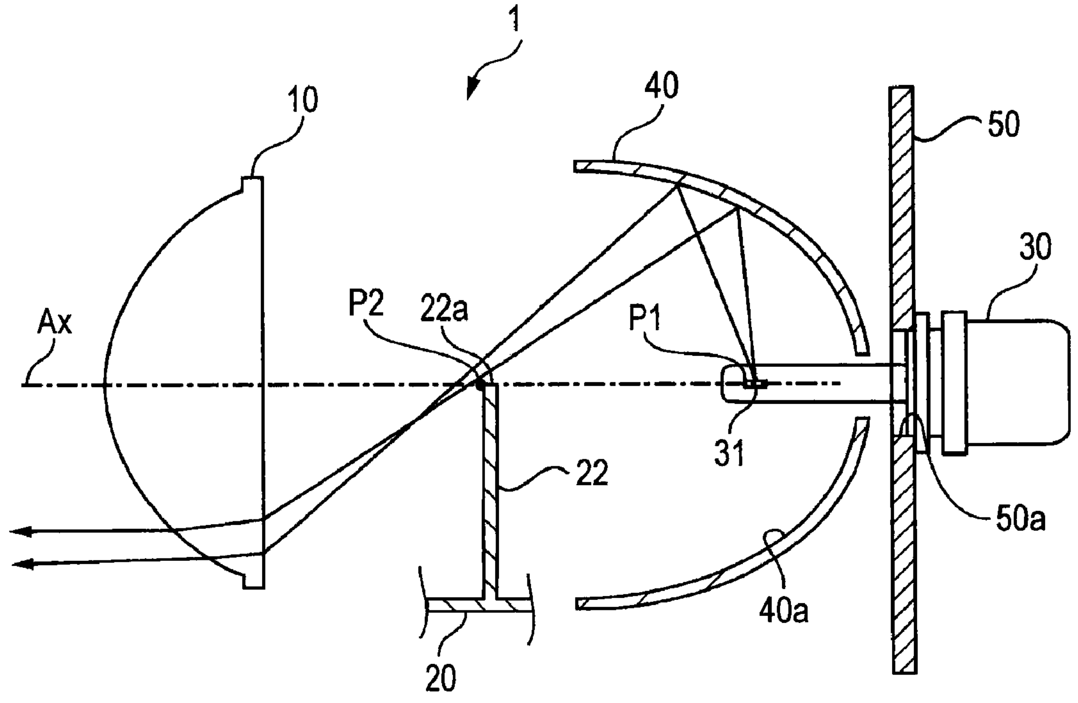
FIG. 4 is a schematic vertical sectional view passing an optical axis.
Figure 6:
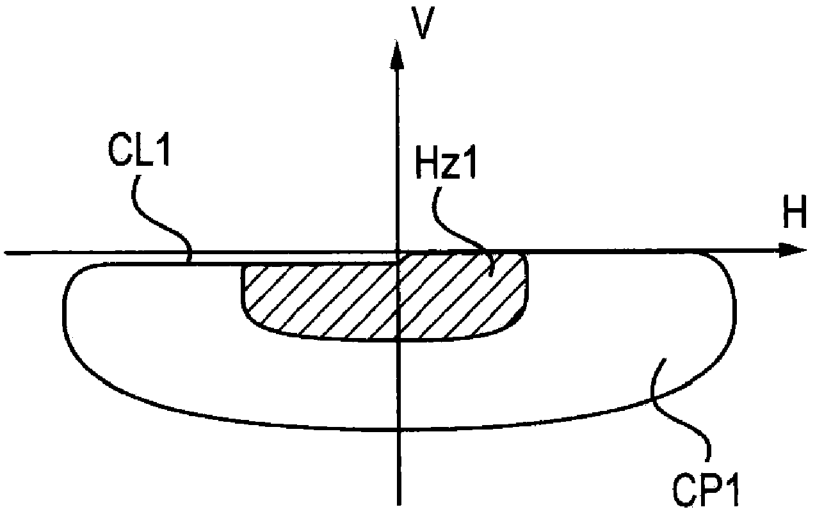
FIGS. 6(*a*) and 6(*b*) illustrate schematic diagrams showing a light distribution pattern projected onto a screen.
Figure 6:
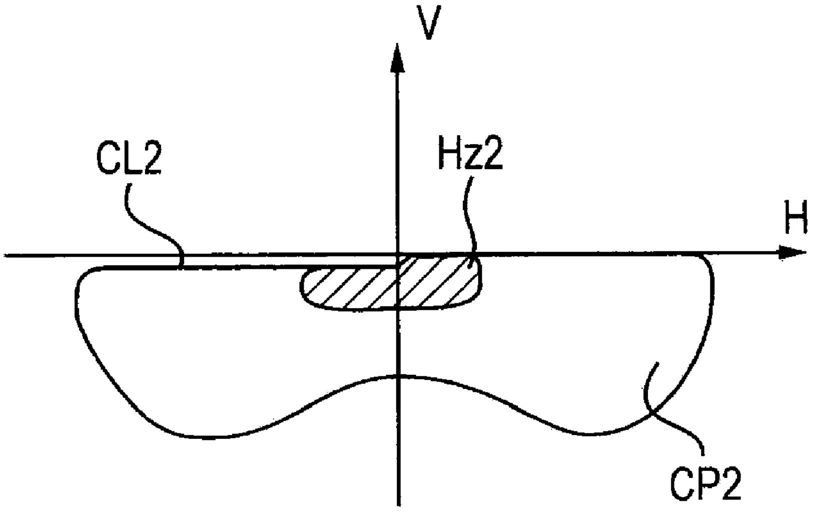

As shown by FIG. 4, light emitted from the light source bulb 30 is reflected by an inner peripheral face 40*a* of the reflector 40. Light reflected by the inner peripheral face 40*a* of the reflector 40 is condensed to a vicinity of a rear focal point of the projecting lens 10 and is incident on the projecting lens 10. Further, the light is irradiated from the projecting lens 10 to a front side along an optical axis Ax. According to the illustrated implementation, the optical axis Ax substantially coincides with a center axis of the projecting lens 10 and a center axis of the reflector 40. A portion of light reflected by the reflector 40 and directed to the projecting lens 10 is blocked by the shade 22 arranged at the vicinity of a rear focal point P2 of the projecting lens 10. Thus, the vicinity of the rear focal point of the projecting lens 10 is formed with an image constituting a bright/dark boundary by an upper end face 22*a*, and an inverted image of the image is projected to the front side. A light distribution pattern CP1 formed with a predetermined cutoff line CL1 at an upper end portion as shown by FIG. 6(*a*) is projected to the front side.

The vehicle headlamp 1 has a reflector displacing mechanism for moving the reflector 40 from a first position to a second position disposed upward and rearward from the base member 50 by moving the reflector 40 in parallel.

The reflector displacing mechanism includes the base member 50, a fixing bracket 55 having a shape of a circular ring in accordance with a shape of an opening of the reflector 40, reflector connecting members 61 through 64, a guide shaft 71, a return spring 72, a pivoting arm 80 and an actuator 91. The bracket 55 is fixed to the lens holder 20.

The reflector displacing mechanism is explained in the following paragraphs.

As shown by FIG. 1, the base member 50 includes a bulb fixing portion 57 having a quadrangular shape, four support arms 51, 52, 53, 54 attached from four corners of the bulb fixing portion 57, and an actuator attaching piece 56 supported by the support arms 52, 54.

The bulb fixing portion 57 of the base member 50 has an opening 50*a* in a circular shape penetrated through its head and tail, and the light source bulb 30 is inserted to be fixed from a rear side along the opening 50*a*. In this state, as shown by FIG. 4, a light emitting portion 31 of the light source bulb 30 is arranged at a vicinity of a first focal point P1 of the reflector 40.

In the base member 50, the four support arms 51 through 54 are arranged to surround the reflector 40, and front ends of the respective support arms 51 through 54 are provided with the reflector connecting members 61, 62, 63, 64. Although the reflector connecting members 61, 62, 63, 64 are shown as separate from the support arms 51 through 54, the reflector connecting members 61, 62, 63, 64 may be formed integrally with the respective support arms 51 through 54. Further, the actuator attaching piece 56 is attached to the actuator 91 for rotating to displace the pivoting arm 80 described below.

Figure 2:
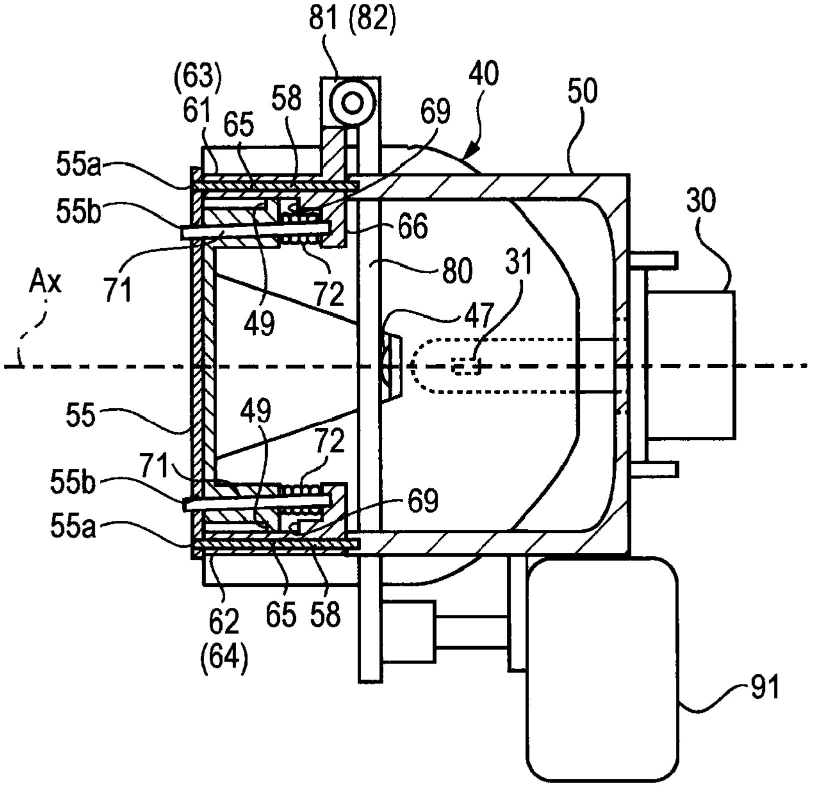
FIG. 2 is a sectional view of the vehicle headlamp according to the first embodiment.

The reflector connecting members 61 through 64 support the reflector 40 by pinching sliders 41, 42, 43, 44 provided at four corners of the reflector 40 between the reflector connecting members 61 through 64 and the fixing bracket 55. As shown by FIG. 1 and FIG. 2, the reflector connecting members 61 through 64 respectively include through holes 65, and are fixed to the base member 50 by insetting fixing pins 58 into the through holes 65. Further, the fixing pins 58 are inserted into four through holes 55*a* provided in correspondence with the bracket 55 for fixing the bracket 55 to the reflector connecting members 61 through 64, The reflector connecting members 61 through 64 are respectively projected with shaft receiving portion 66 at either of upper and lower portions thereof substantially orthogonally respectively to the optical axis Ax. Front sides in an optical axis direction of the shaft receiving portions 66 are respectively provided with recess portions 67, one ends of the guide shafts 71 are inserted to the recess portions 67 to position the shafts 71.

Four of the guide shafts 71 are respectively inserted into through holes 46 at the sliders 41 through 44 and through holes 55*b* of the fixing bracket 55. Thus, the reflector 40 is displaceably supported along the guide shafts 71 between the fixing bracket 55 and the reflector connecting members 61 through 64. Here, four of the guide shafts 71 are arranged to be inclined relative to the optical axis Ax by small angles. Specifically, a rear end of the guide shaft 71 is arranged to be disposed on an upper side of a front end thereof by displacing the reflector 40 along the guide shaft 71, the reflector 40 is displaced upward and rearward from the base member 50. That is, according to the illustrated implementation, the guide shafts 71 and the sliders 41 through 44 constitute guide members for guiding the reflector 40.

Between the sliders 41 through 44 of the reflector 40 and the reflector connecting members 61 through 64, the return springs 72 are respectively provided at surroundings of the guide shafts 71. The return springs 72 are compression coil springs as urging members for urging the reflector 40 and the reflector 40 is pressed to the fixing bracket 55 by urge forces of the return springs 72 as shown by FIG. 2. This first position can be referred to as the normal state.

Next, the pivoting arm 80 is explained.

The pivoting arm 80 is a member substantially in a U-like shape for displacing the reflector 40 by urging the reflector 40 in a direction opposite to that of the return springs 72. The reflector connecting members 61, 63 are projected with arm receiving portions 68 attaching the pivoting arm 80 on sides thereof opposed to the shaft receiving portions 66. Through holes 68*a* of the arm receiving portion 68 are inserted with a pivoting shaft 83, and the pivoting shaft 83 is inserted to through holes 81*a*, 82*a* formed respectively at two end portions 81, 82 of the pivoting arm 80. Thereby, the pivoting arm 80 is pivotably fixed relative to the reflector connecting members 61 through 64, that is, the base member 50.

Figure 3:
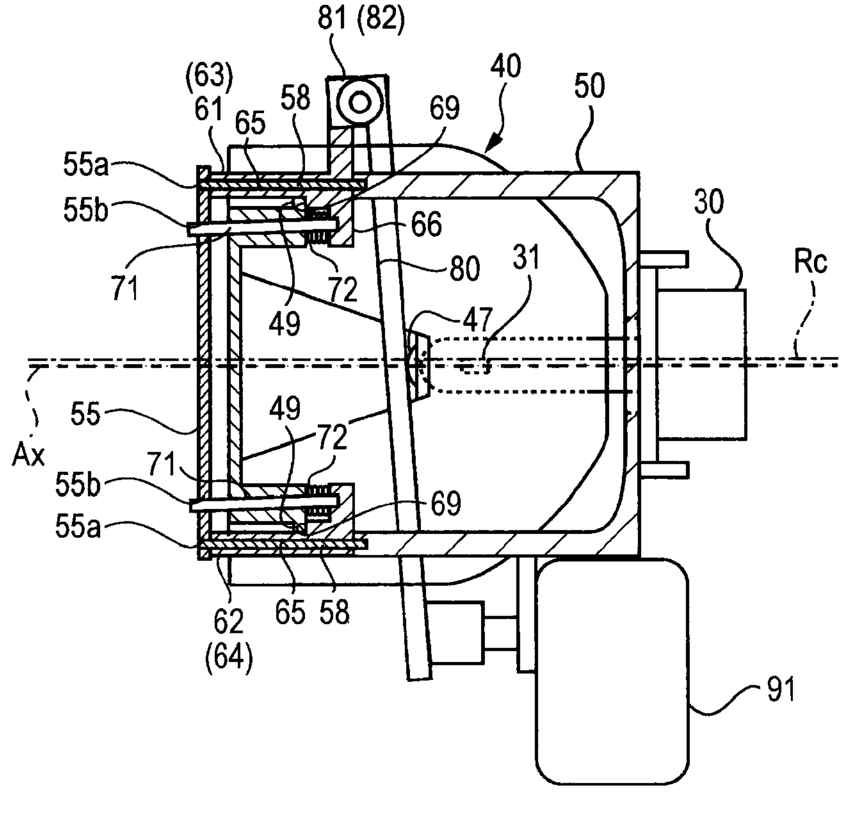
FIG. 3 is a sectional view of state of displacing a pivoting arm in FIG. 2.

An inserting hole 84 is opened at one side on a lowermost side of the pivoting arm 80. An actuator connector 92 connected to a front end of a drive portion 91*a* of the actuator 91 is inserted into the through hole 84 to be fixed thereby. The pivoting arm 80 is rotated by arranging a pivoting axis by the pivoting shaft 83 in accordance with a displacement in a front and rear direction of the drive portion 91*a* of the actuator 91. When the pivoting arm 80 is pivoted, the pivoting arm 80 presses projections 47 integrally formed with sides of two side faces of the reflector 40 to move the reflector 40 to the rear side and the upper side against pressures of the return springs 72. The reflector 40 pressed by the pivoting arm 80 is displaced to a second position at which its position is restricted by bringing positioning projections 49 formed at the respective sliders 41 through 44 into contact with stoppers 69 provided at the respective reflector connecting members 61 through 64 (refer to FIG. 2 and FIG. 3). In the illustrated implementation, the second position is displaced from the first position to the rear side by 2 mm and to the upper side by 0.6 mm.

Next, operation and effect by the reflector displacing mechanism will be explained with reference to FIG. 4 through FIG. 6.

Figure 5:
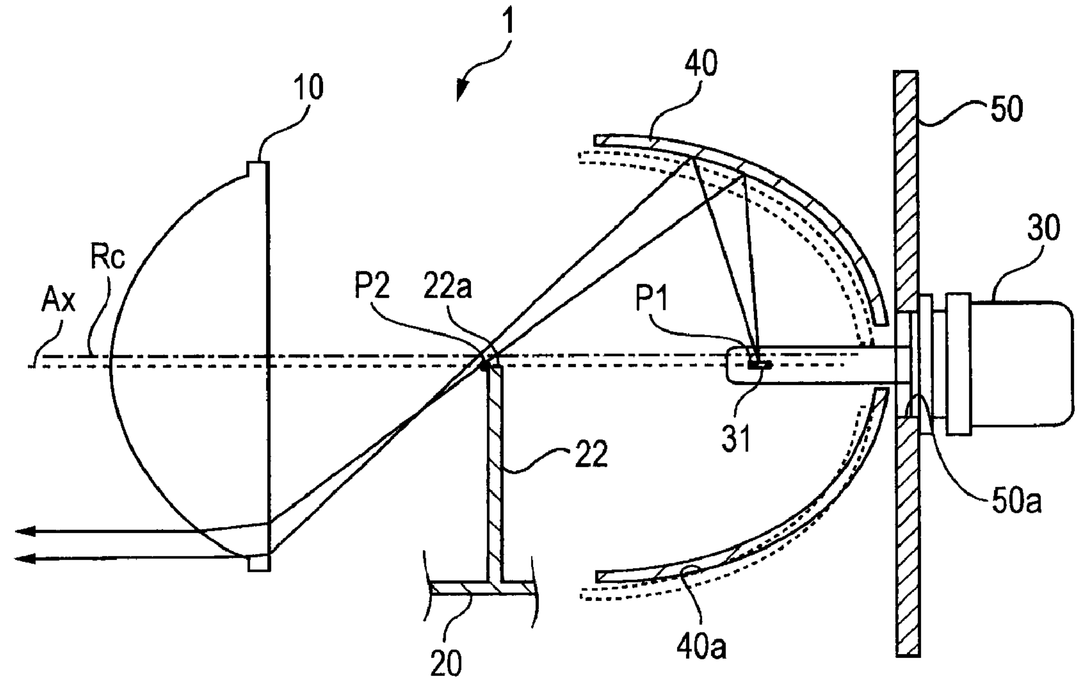
FIG. 5 is a schematic vertical sectional view of the state of displacing the pivoting arm.

When the reflector 40 is displaced from the first position to the second position by operating the reflector displacing mechanism, the reflector 40 is changed from the state shown in FIG. 4 to a state of being displaced to the rear side and the upper side as shown by FIG. 5. In FIG. 5, broken lines indicate the reflector 40 at a position corresponding to FIG. 4. As can be seen by comparing the two drawings, even when the reflector 40 is displaced to the rear side and the upper side, positions of the light source bulb 30 and the projecting lens 10 remain substantially unchanged. Therefore, the reflector center axis Rc is shifted from the projecting lens center axis and the light emitting portion 31 (that is, shifted from the optical axis Ax before displacement), and a direction of reflecting light by the inner peripheral face 40*a* of the reflector 40 is changed.

A change in the direction of reflecting light effects an influence on the light distribution pattern projected to the front side. Specifically, when the reflector 40 is in the first position, the light distribution pattern is as shown by FIG. 6(*a*). On the other hand, when the reflector is changed to the second position, as shown by FIG. 6(*b*), light at a vicinity of a lower side of V line is moved to the upper side and an amount of irradiating light at the vicinity of the lower side of the V line is reduced. Thereby, the amount of light irradiated toward the surface of the road is reduced, and glare by light reflected from the road surface can be reduced when the reflector 40 is arranged at the second position more than that when the reflector 40 is arranged at the first position.

Further, when the reflector 40 is displaced to the second position, a region of a hot zone Hz2 having a large amount of irradiating light becomes narrower than a hot zone Hz1 in the case of the first position. In this case, an illuminance of the hot zone Hz2 becomes larger than that in the case of the hot zone Hz1, and remote optical recognizability can be promoted when the reflector 40 is arranged at the second position more than that when the reflector 40 is arranged at the first position.

Thus, according to the vehicle headlamp 1 of the illustrated implementation, not only a position and a light amount of the hot zone can be changed, but also the total illuminance distribution can be changed. The basic light distribution can be formed when the reflector 40 is disposed at the first position, and a motorway light distribution suitable for a motorway or the like or a wet mode light distribution suitable for running in rainy weather can be realized when the reflector 40 is disposed at the second position.

In this way, the reflector 40 is arranged to move to the rear side and the upper side in parallel while fixing the projecting lens 10 and the light source bulb 30. Therefore, the motorway light distribution or the wet mode light distribution suitable for running in rainy weather can be realized. The reflector not only can be moved in parallel, but also can be rotated. Thus, a desired light distribution pattern can be provided by changing the light distribution pattern by moving the reflector in parallel as explained above.

In contrast to the type of headlamp in which the light source bulb is moved, an arrangement of displacing the reflector 40 and not moving the light source bulb 30 is provided. Therefore, with regard to variable light distribution, there is no load on the light source bulb 30, and high reliability can be maintain without reducing the life of the light source bulb 30.

Next, a second embodiment of a vehicle headlamp according to the invention is explained.

Although a basic structure of a vehicle headlamp 100 of the second embodiment is similar to that of the vehicle headlamp 1 of the first embodiment, and its operation and effect are similar, the arrangement of the reflector displacing mechanism differs in some respects. In the following explanation, only components different from those of the first embodiment will be explained to avoid unnecessary repetition.

The reflector displacing mechanism is explained in the following paragraphs.

Front ends of the respective support arms 51 through 54 of the base member 50 have respective reflector connecting members 161, 162, 163, 164. Although the reflector connecting members 161, 162, 163, 164 are illustrated as separate from the support arms 51 through 54, the reflector connecting members 161, 162, 163, 164 may respectively be formed integrally with the support arms 51 through 54.

Figure 7:
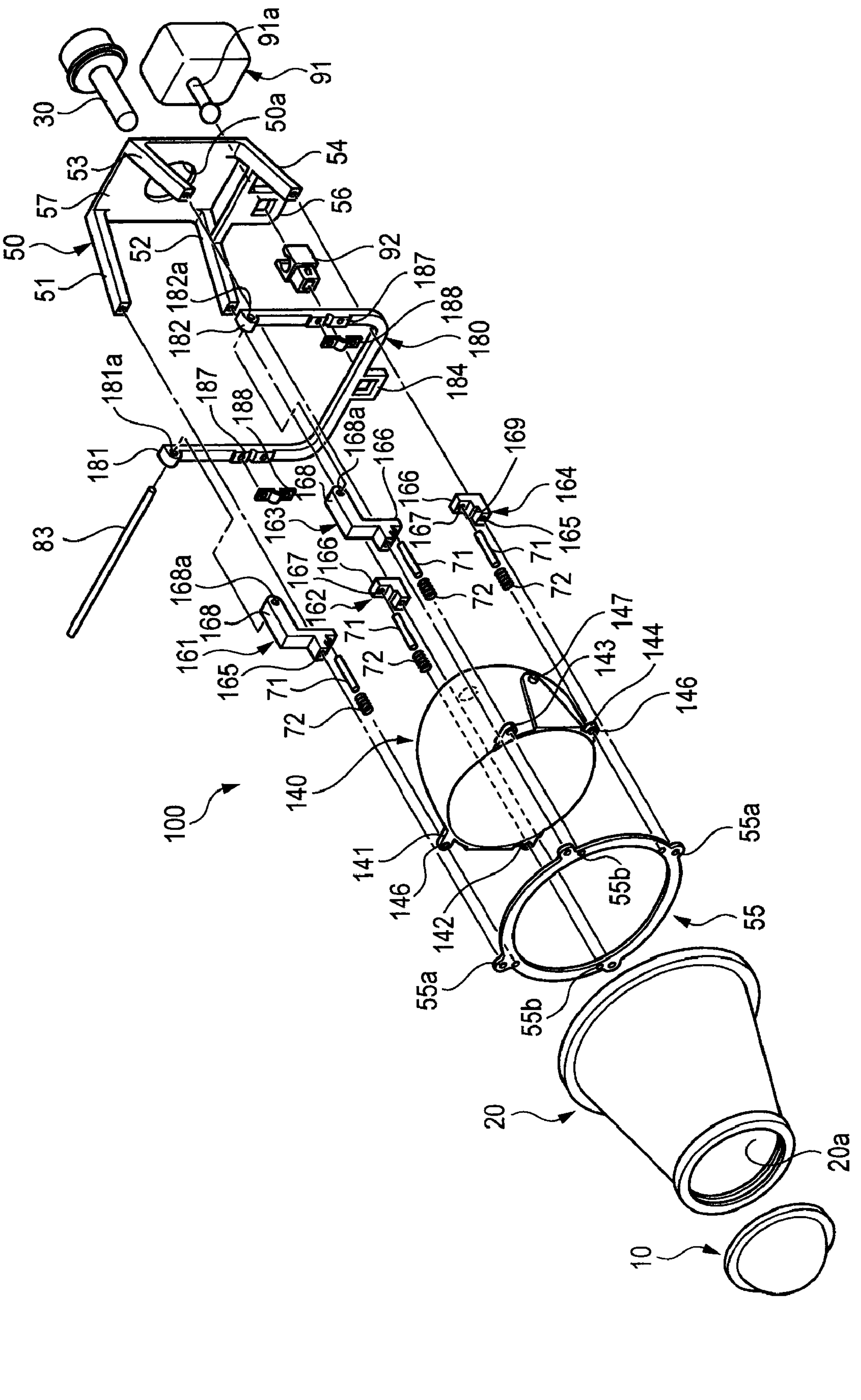
FIG. 7 is a disassembled perspective view of a vehicle headlamp according to a second embodiment.
Figure 8:
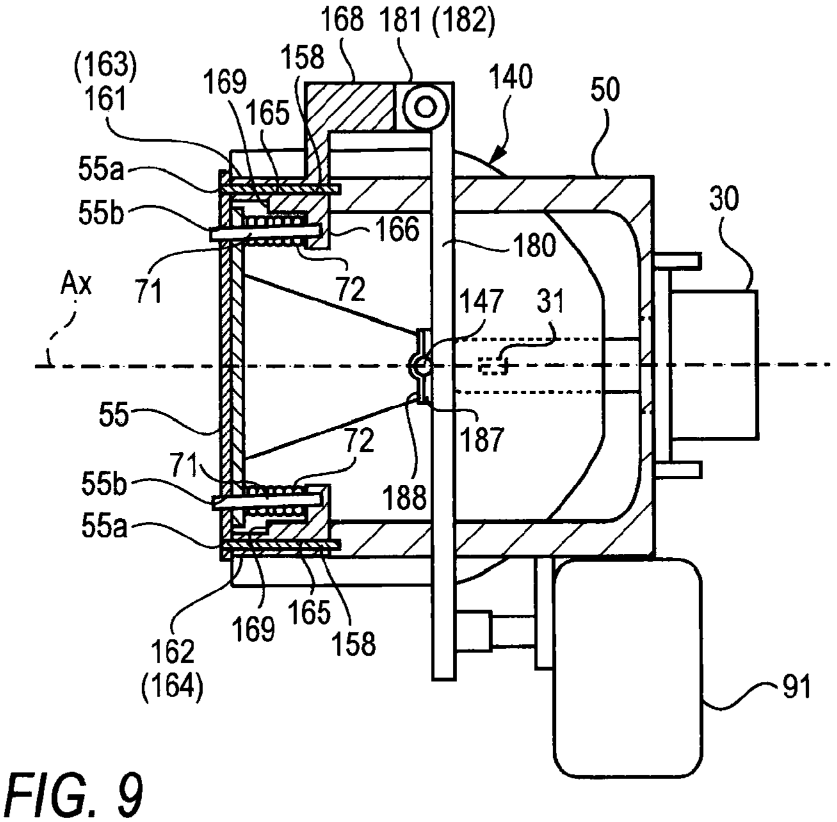
FIG. 8 is a sectional view of the vehicle headlamp according to the second embodiment.

The reflector connecting members 161 through 164 support the reflector 40 by pinching attaching pieces 141, 142,

143, 144 provided at a reflector 140 between the reflector connecting members 161 through 164 and the fixing bracket 55. As shown by FIG. 7 and FIG. 8, the reflector connecting members 161 through 164 respectively include through holes 165, and are fixed to the base member 50 by inserting fixing pins 158 to the through holes 165. Further, the fixing pins 158 are inserted to four through holes 55*a* provided in correspondence with the fixing bracket 55 to fix the fixing bracket 55 to the reflector connecting members 161 through 164.

The reflector connecting members 161 through 164 are projected with shaft receiving portions 166 at either of upper and lower sides thereof respectively orthogonal substantially to the optical axis Ax. Front sides in an optical axis direction of the shaft receiving portions 166 are respectively provided with recess portions 167, and the guide shafts 71 are positioned by inserting one ends of the guide shafts 71 to the recess portions 167.

Four of the guide shafts 71 are respectively inserted to through holes 146 of attaching pieces 141 through 144 of the reflector 140 and the through holes 55*b* of the fixing bracket 55. Thereby, the reflector 140 is displaceably supported along the guide shafts 71 between the fixing bracket 55 and the reflector connecting members 161 through 164.

Further, between the attaching pieces 141 through 144 of the reflector 140 and the reflector connecting members 161 through 164, the return springs 72 are respectively provided at surroundings of the guide shafts 71. The return springs 72 are the compression coil springs as urge members for urging the reflector 140, and the reflector 140 is pressed to the fixing bracket 55 by the urge forces of the return springs 72 as shown by FIG. 8. This first position can be referred to as a normal state.

Next, the pivoting arm 180 is explained.

The pivoting arm 180 is a member substantially in a U-like shape for urging the reflector 140 in a direction opposite to that of the return spring 72 to displace the reflector 140. The reflector connecting members 161, 163 are projected with arm receiving portions 168 for attaching the pivoting arm 180 on sides opposed to the shaft receiving portions 166. The pivoting shaft 83 is inserted to through holes 168*a* of the arm receiving portions 168, and the pivoting shaft 83 is inserted to through holes 181*a*, 182*a* respectively formed at the two end portions 181, 182 of the pivoting arm 180. Thus, the pivoting arm 180 is pivotably fixed to the reflector connecting members 161 through 164, that is, the base member 50.

An inserting hole 184 is opened at a side on a lowest side of the pivoting arm 180. The actuator connecting connector 92 connected to the front end of the drive portion 91*a* of the actuator 91 is inserted to the inserting hole 184 to be fixed thereby.

Both side portions of the pivoting arm 180 are formed with hinge recess portions 187 in a semicylindrical shape. The hinge recess portions 187 support pivoting pins 147 integrally formed with the reflector 140 to project from sides of the both side faces of the reflector 140 in side directions, and the pivoting pins 147 are supported pivotably by pinching the pivoting pins 147 between the hinge recess portions 187 and guide covers 188. The pivoting pins 147, the hinge recess portions 187 and the guide covers 188, form a link mechanism for converting a pivoting displacement of the pivoting arm 180 into a straight moving displacement of the reflector 140.

Figure 9:
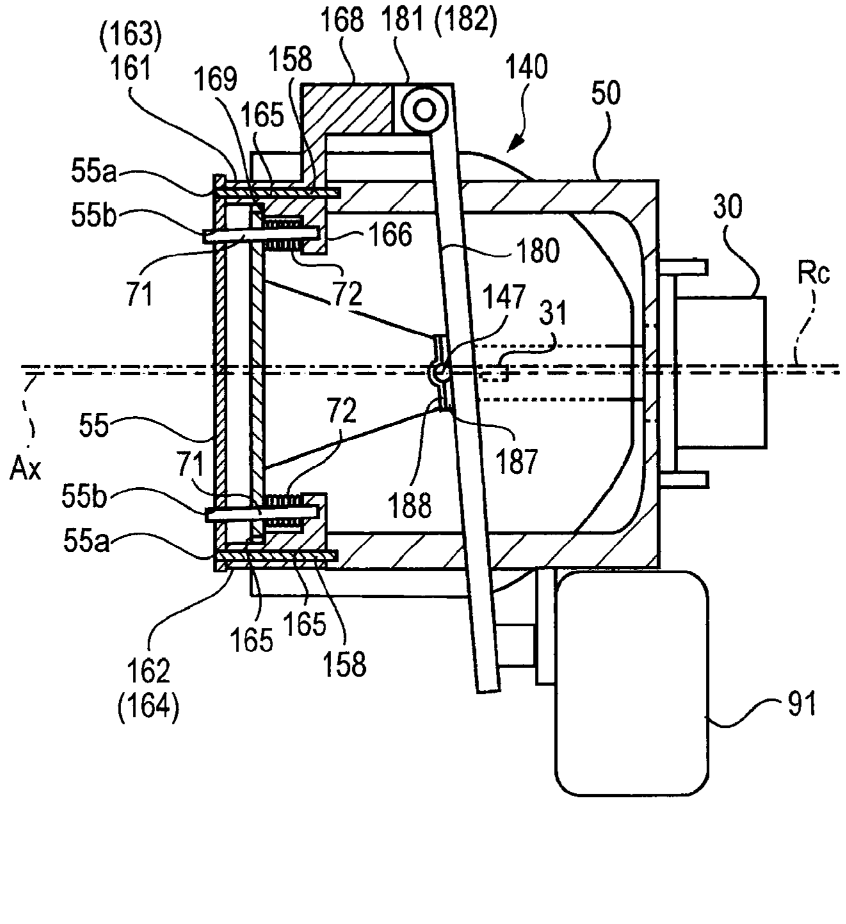
FIG. 9 is a sectional view of a state of displacing a pivoting arm in FIG. 8.

The pivoting arm 180 is pivoted by arranging a pivoting axis by the pivoting shaft 83 in accordance with a displacement in a front and rear direction of the drive portion 91*a* of the actuator 91. When the pivoting arm 180 is pivoted, the pivoting arm 180 guides the reflector 140 to the rear side while pivoting the pivoting pins 147 integrally formed with the both side faces of the reflector 140 to move the reflector 140 to the rear side and the upper side against pressures of the return springs 72. The reflector 140 pressed by the pivoting arm 180 is displaced to the second position at which the respective attaching pieces 141 through 144 are brought into contact with stoppers 169 provided at the respective reflector connecting members 161 through 164 to restrict a position thereof (see FIG. 8 and FIG. 9).

The reflector 140 is not slid along the straight moving guide for restricting rotation of the reflector 140. Instead, rotational movement of the reflector 140 is permitted by pivoting the pivoting pins 147. Therefore, although in the midst of moving, the reflector 140 is not moved in parallel, an angle of rotating the reflector 140 at the second position can be adjusted by an angle of faces of the stopper 169 and the reflector 140 brought into contact with each other. By adjusting the angle of the contact face of the stopper 169 to coincide with the angle of the reflector at the second position of the first embodiment (i.e., by setting the angle of the contact face of the stopper 169 such that the contact faces of the fixing bracket 55 and the reflector 140 are in parallel with each other), the reflector 140 can be moved to the rear side and the upper side.

A change in an optical path when the reflector 140 is moved in parallel to the rear side and the upper side is similar to that shown in FIG. 4 and FIG. 5. That is, overall operation and effect are similar to those of the first embodiment as shown by FIG. 6(*a*) and FIG. 6(*b*).

Next, a third embodiment of a vehicle headlamp according to the invention is explained.

A vehicle headlamp 200 includes two additional reflectors 210, 220 for increasing a light amount of the vehicle headlamp 1 of the first embodiment. Although openings need to be provided on upper and lower sides of the lens holder 20 for the two additional reflectors 210, 220, other parts of the structure are the same. An explanation of differences is provided below.

Figure 10:
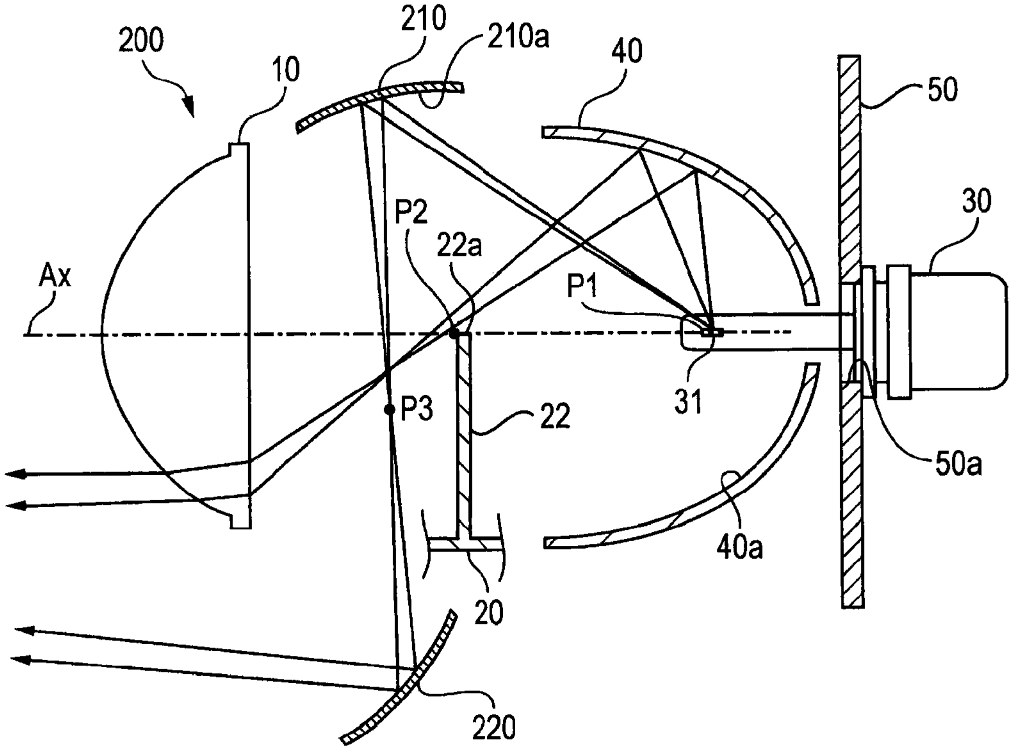
FIG. 10 is a schematic vertical sectional view passing an optical axis of a vehicle headlamp according to a third embodiment.
Figure 11:
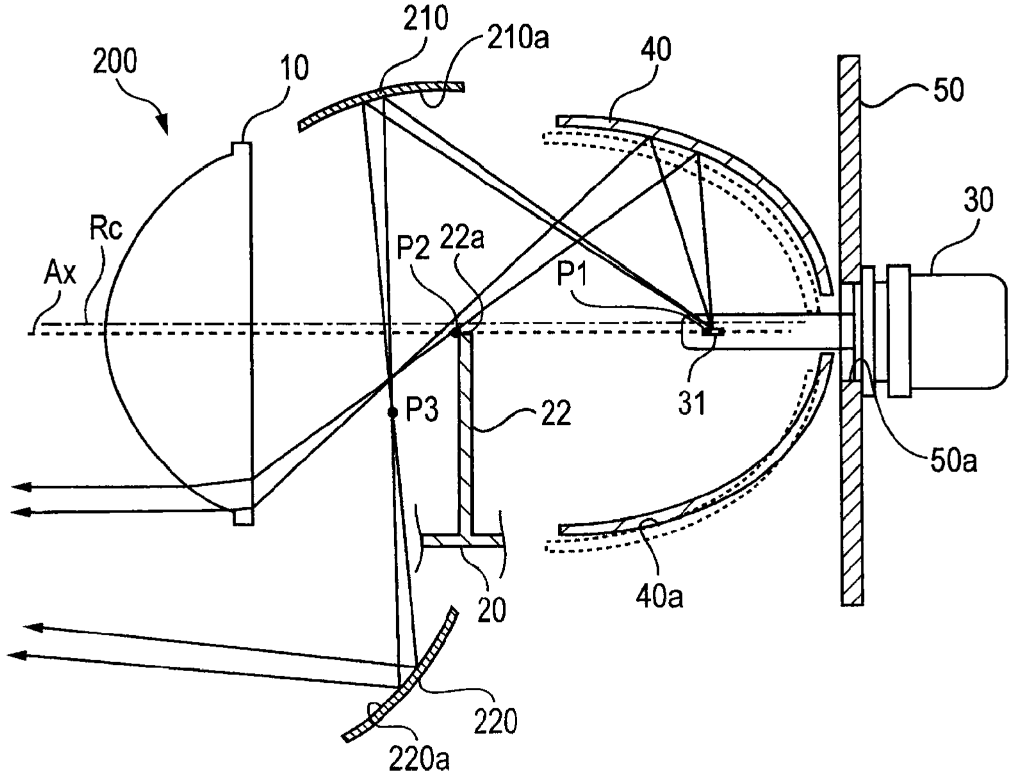
FIG. 11 is a schematic vertical sectional view of a state of displacing a pivoting arm.

According to third embodiment, as shown by FIG. 10 and FIG. 11, the additional reflectors 210, 220 are provided on upper and lower sides of the optical axis Ax of the vehicle headlamp 200.

The additional reflector 210 includes a reflecting face 210*a* having substantially a shape of an ellipsoid of revolution for reflecting light emitted from the light emitting portion 31 of the light source bulb 210 to a vicinity of a second focal point P3.

On the other hand, the additional reflector 220 is arranged in the shape of a paraboloid having a focal point substantially coinciding with the second focal point P3 of the additional reflector 210, including a reflecting face 220*a* having a free curve shape providing a reference by a paraboloid in a horizontal sectional shape thereof for irradiating light irradiated to a vicinity of the second focal point P3 to a front side. The light contributes to an auxiliary light distribution pattern for increasing the total light amount overlapped on a light distribution pattern formed by an optical system formed by the reflector 40 and the projecting lens 10.

Although in the vehicle headlamp 200 the reflector 40 is arranged to be able to move in parallel to the rear side and the upper side, the optical system with regard to the additional reflectors 210, 220 is not related to the displacement of the reflector 40. Therefore, the additional reflectors 210, 220 irradiate substantially the same light to the front side regardless of the position of the reflector 40.

Figure 12:
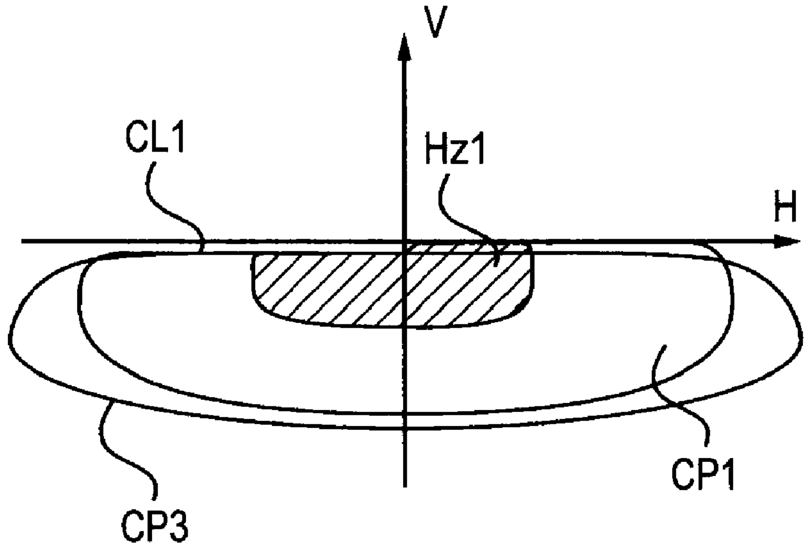
FIGS. 12(*a*) and 12(*b*) illustrates schematic diagrams for showing light distribution patterns projected onto a screen.
Figure 12:
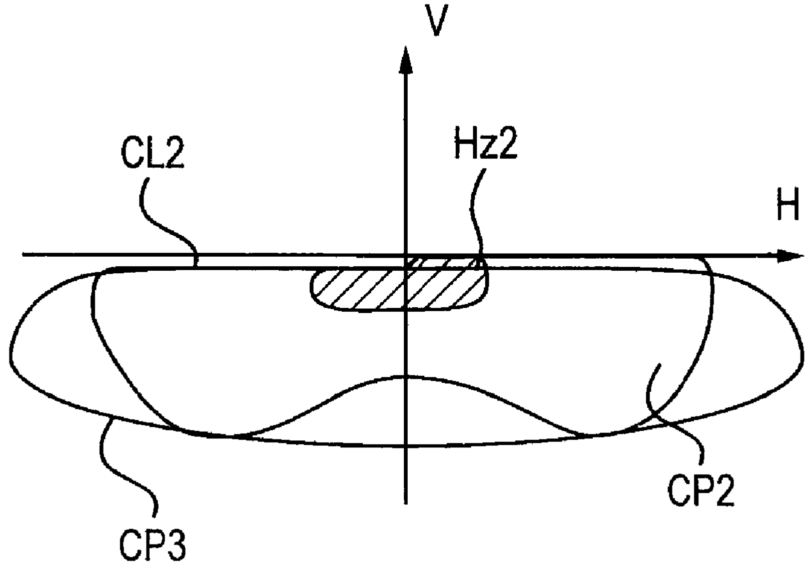

In reference to FIGS. 12(*a*) and 12(*b*), a light distribution pattern formed by light irradiated to the front side by way of the reflector 40 and the projecting lens 10 forms a light distribution pattern CP1 as shown by FIG. 12(*a*) when a position of the reflector 40 is disposed at the first position. On the other hand, when the position of the reflector 40 is disposed at the second position, as shown by FIG. 12(*b*), the light distribution pattern changes to a light distribution pattern CP2. However, a light distribution pattern CP3 formed by the additional reflectors 210, 220 becomes the light distribution pattern CP3 having the same shape in either case and is not changed.

Therefore, by providing the additional reflectors 210, 220, the displacement of the reflector 40 does not impact the light distribution pattern formed by the additional reflectors. The reflector 40 can be displaced without concern for the presence of the additional reflectors 210, 220. The optical system of the reflector 40 and the optical system of the additional reflectors 210, 220 are independent from each other and, therefore, the desired light distribution pattern can be provided.

Other implementations are within the scope of the claims.

What is claimed is:

1. A vehicle headlamp comprising:

a light source bulb for emitting light;

a base member to which the light source bulb is fixed;

a reflector with an optical axis for reflecting the light emitted from the light source bulb;

a projecting lens for projecting light reflected by the reflector to a front side along an optical axis; and a shade for blocking a portion of light directed from the reflector toward the projecting lens;

wherein the vehicle headlamp includes a reflector displacing mechanism to move the reflector linearly from a first position to a second position which is upward and toward the base member, wherein the optical axis at the first position is parallel to the optical axis at the second position, and wherein the reflector displacing mechanism includes:

a pivoting arm attached pivotably to the base member and operable to urge the reflector, an actuator for pivoting the pivoting arm, and a link mechanism connecting the pivoting arm and the reflector and operable to convert a pivoting displacement of the pivoting arm into a straight moving displacement of the reflector.

2. The vehicle headlamp according to claim 1, wherein the reflector displacing mechanism includes a guide member for holding the reflector to be able to slide to displace relative to the base member;

wherein the pivoting arm slides to displace the reflector from the first position to the second position along the guide member by pressing the reflector.

3. The vehicle headlamp according to claim 1, wherein the reflector forms a basic light distribution when disposed at the first position and forms a motorway light distribution when disposed at the second position.

4. The vehicle headlamp according to claim 2, wherein the reflector forms a basic light distribution when disposed at the first position and forms a motorway light distribution when disposed at the second position.

5. The vehicle headlamp according to claim 1, further comprising a pivoting shaft that is perpendicular to the optical axis, wherein the pivoting arm is pivotable about the pivoting shaft.

6. The vehicle headlamp according to claim 1 wherein, when the position of the reflector is changed from the first position to the second position, a light in the vicinity of a lower side of a vertical line of a light distribution is moved to an upper side, and an amount of irradiating light in the vicinity of the lower side of the vertical line is reduced.

7. The vehicle headlamp according to claim 1 wherein a region of a hot zone when the reflector is disposed in the second position is narrower than a hot zone when the reflector is disposed in the first position, and wherein an illuminance of the hot zone when the reflector is disposed in the second position is larger than an illuminance of the hot zone when the reflector is disposed in the first position.

8. The vehicle headlamp according to claim 1 wherein a height of a cutoff line is unchanged when the reflector is moved from the first position to the second position.

* * * * *